United States Patent
Hofmann et al.

(10) Patent No.: US 10,634,112 B2
(45) Date of Patent: Apr. 28, 2020

(54) BEARING MODULE FOR ADJUSTING A ROTOR BLADE ANGLE OF ATTACK IN AN UNDERWATER POWER PLANT

(71) Applicant: Aktiebolaget SKF, Gothenburg (SE)

(72) Inventors: Matthias Hofmann, Schweinfurt (DE); Michael Baumann, Gaedheim (DE)

(73) Assignee: Aktiebolaget SKF, Gothenburg (SE)

(*) Notice: Subject to any disclaimer, the term of this patent is extended or adjusted under 35 U.S.C. 154(b) by 292 days.

(21) Appl. No.: 15/656,513

(22) Filed: Jul. 21, 2017

(65) Prior Publication Data
US 2018/0030949 A1  Feb. 1, 2018

(30) Foreign Application Priority Data

Jul. 28, 2016 (DE) .......................... 10 2016 213 935

(51) Int. Cl.
*F03B 11/06* (2006.01)
*F16C 17/26* (2006.01)
*F16C 33/02* (2006.01)
*F16C 19/54* (2006.01)
(Continued)

(52) U.S. Cl.
CPC ............ *F03B 11/06* (2013.01); *F03B 11/006* (2013.01); *F03B 13/264* (2013.01); *F16C 17/26* (2013.01); *F16C 19/54* (2013.01); *F16C 33/02* (2013.01); *F16C 33/72* (2013.01); *F16C 33/74* (2013.01); *F16C 33/76* (2013.01); *F05B 2240/50* (2013.01); *F05B 2240/57* (2013.01); *F05B 2260/79* (2013.01); *F16C 2237/00* (2013.01);
(Continued)

(58) Field of Classification Search
CPC ...... F03B 11/06; F03B 13/264; F03B 11/006; F03B 11/008; F16C 33/76; F16C 33/74; F16C 2360/00; F16C 2237/00; F16C 33/02; F16C 17/26; F16C 33/72; F16C 19/54; Y02P 70/527; Y02E 10/226; Y02E 10/28; Y02E 10/38; Y02E 10/223; F05B 2260/79; F05B 2240/57; F05B 2240/50
See application file for complete search history.

(56) References Cited

U.S. PATENT DOCUMENTS 1,837,568 A   12/1931  Moody
3,936,224 A *  2/1976  Nordquist ................. F03B 3/02
                                             415/203
(Continued)

FOREIGN PATENT DOCUMENTS

DE   102010019769 A1    7/2017
WO   20120044771 A1     4/2012
WO   2015/181204 A1    12/2015

*Primary Examiner* — Eldon T Brockman
(74) *Attorney, Agent, or Firm* — Garcia-Zamor Intellectual Property Law; Ruy Garcia-Zamor; Bryan Peckjian

(57) ABSTRACT

A bearing module for adjusting a rotor blade angle of attack in an underwater power plant includes a rotor-blade shaft, at least two bearings for supporting the rotor-blade shaft, the at least two bearings being axially spaced from each other on the rotor-blade shaft, a first attachment structure for producing a mechanical connection to a rotor-blade hub, a second attachment structure for producing a mechanical connection to the rotor blade, and a third attachment structure for producing a mechanical connection to a blade adjustment mechanism, wherein the bearing module is an installation unit such that it can be assembled at one location and transported to a second location where rotor blades may be attached.

12 Claims, 4 Drawing Sheets

(51) Int. Cl.
 *F16C 33/72* (2006.01)
 *F03B 11/00* (2006.01)
 *F03B 13/26* (2006.01)
 *F16C 33/74* (2006.01)
 *F16C 33/76* (2006.01)

(52) U.S. Cl.
 CPC ......... *F16C 2360/00* (2013.01); *Y02E 10/223* (2013.01); *Y02E 10/226* (2013.01); *Y02E 10/28* (2013.01); *Y02E 10/38* (2013.01); *Y02P 70/527* (2015.11)

(56) References Cited

U.S. PATENT DOCUMENTS

| | | | |
|---|---|---|---|
| 5,660,527 | A | 8/1997 | Deering et al. |
| 7,331,761 | B2 * | 2/2008 | Hansen ................. F03D 7/0224 416/11 |
| 8,633,609 | B2 * | 1/2014 | Cornelius ................. E02B 9/00 290/54 |
| 10,458,549 | B2 | 10/2019 | Baumann et al. |
| 2007/0104577 | A1 * | 5/2007 | Hansen ................. F03D 7/0224 416/104 |
| 2010/0086409 | A1 | 4/2010 | Whiley et al. |
| 2011/0142618 | A1 * | 6/2011 | Moore ................. F03D 1/0658 415/229 |
| 2011/0293404 | A1 * | 12/2011 | Hamad ................... F03B 11/06 415/118 |
| 2012/0013129 | A1 * | 1/2012 | Cornelius ................ E02B 9/00 290/54 |
| 2014/0186185 | A1 * | 7/2014 | Fox ....................... F03D 1/0658 416/174 |

* cited by examiner

BEARING MODULE FOR ADJUSTING A ROTOR BLADE ANGLE OF ATTACK IN AN UNDERWATER POWER PLANT

CROSS-REFERENCE

This application claims priority to German patent application no. DE 10 2016 213 935.5 filed on Jul. 28, 2016, the contents of which are fully incorporated herein by reference.

TECHNOLOGICAL FIELD

Exemplary embodiments relate to a bearing module for adjusting a rotor blade angle of attack in an underwater power plant as well as to a manufacturing method for an underwater power plant.

BACKGROUND

Extracting current from the energy of the sea is a current trend. In systems that extract energy from the sea, flowing water drives rotor blades of an underwater power plant and generates current via the rotor shaft and a generator connected downstream.

One of the requirements of manufacturers of underwater power plants and tidal power plants is compact and highly reliable blade bearings and sealing solutions for tidal power plants that can be used in harsh underwater environments.

There is therefore a need for a concept for more reliable, more compact, and more cost-effective blade bearings for underwater power plants.

SUMMARY

This need is met by a bearing module, a manufacturing method, and an underwater power plant according to the present disclosure.

Exemplary embodiments relate to a bearing module for rotative adjusting of a rotor blade in an underwater power plant. The bearing module comprises at least two bearings for supporting a rotor-blade shaft. In at least some exemplary embodiments the bearing module further comprises the rotor-blade shaft itself, a bearing housing, as well as an inner and outer seal against water. The bearing module further includes attachment means for production of mechanical connections to a rotor-blade hub, to a rotor blade, and to a blade adjustment. The individual components mentioned are combined as a bearing module into a complete installation unit, which makes possible a low-cost and low-effort installation, replacement, and repair. Furthermore, due to the combination into an installation unit, a greater compactness and a better sealing effect can be made possible. The installation unit can be installed or replaced with a reduced time expenditure. A simplified repair can occur in a repair center and need not be carried out on site. Furthermore, the manufacturing of the bearing module by assembly experts can occur in a (dust- and weather-) protected environment; the bearing need not be assembled on site. The at least two bearings can make possible a high axial as well as radial stability.

Exemplary embodiments provide a bearing module for adjusting an attack angle of a rotor blade in an underwater power plant. The bearing module comprises at least two bearings for supporting a rotor blade shaft. The at least two bearings are disposed on the rotor blade shaft axially at a spacing from each other. The bearing module further comprises at least one first attachment means for producing a mechanical connection to the rotor-blade hub. The bearing module further comprises at least one second attachment means for producing a mechanical connection to the rotor blade. The bearing module further comprises at least one third attachment means for producing a mechanical connection to a blade-adjusting device. The bearing module is combined into an installation unit.

In at least some exemplary embodiments an arrangement of the rotor blades can be provided in the radial direction with respect to an axis of rotation of the rotor-blade hub outside the rotor-blade hub. An arrangement of the blade adjustment can be provided in the radial direction with respect to the axis of rotation of the rotor-blade hub inside the rotor-blade hub. The axis of rotation of the rotor-blade hub and the axis of rotation of the rotor-blade shaft for the adjusting of the rotor blade can differ in their directions. The mechanical connection of the bearing module to the rotor blade can be provided by the second attachment means via the rotor-blade shaft. The mechanical connection of the bearing module to the blade adjustment mechanism can be provided by the third attachment means via the rotor-blade shaft. A protection of the blade adjustment mechanism from external influences, such as seawater and corrosion, can be achieved by disposing the blade adjustment mechanism inside the rotor-blade hub. The difference between the rotational axes of the rotor-blade hub and rotor-blade shaft can make possible an adjusting of an angle of attack of the rotor blade, in order to, for example, adapt to a power obtained from the underwater power plant.

In one preferred exemplary embodiment the bearing module further comprises a bearing housing. The mechanical connection of the bearing module to the rotor-blade hub can be provided by the first attachment means via the bearing housing. There is an intermediate space between the bore of the bearing housing and the rotor-blade shaft. In exemplary embodiments the at least two bearings (rolling-element bearings or sliding bearings) are disposed here. In some exemplary embodiments the bearing housing is the outer casing of the bearing module and makes possible the assembly of the bearing module as a complete installation unit for attaching into the blade hub.

In one preferred exemplary embodiment the bearing module further comprises an inner seal system and an outer seal system. The inner seal system is disposed radially farther inward in the direction of the axis of rotation of the rotor shaft and is, for example, only impinged with air or a gas. The outer seal system is, for example, disposed radially farther outward with respect to the axis of rotation of the rotor shaft. The outer seal system prevents the ingress of liquids, such as seawater, from outside into the bearing module or into the blade hub. The inner seal system holds the lubricant inside the bearing module. The outer seal system also holds the lubricant inside the bearing module and prevents an escape of the lubricant to the surrounding liquid, that is, water.

In some exemplary embodiments the at least two bearings can comprise at least one element of the group of sliding bearings and rolling-element bearings. The rolling-element bearing can, for example, be based on at least one element of the group of tapered rollers, barrel rollers, rollers for spherical bearings, needle rollers, and balls. The at least two bearings can comprise at least one locating bearing and at least one non-locating bearing. The at least two bearings can also correspond to an adjusted bearing assembly using two tapered roller bearings. In some exemplary embodiments the two bearings can allow a small amount of axial and radial clearance and provide a robust bearing system for tidal power plants. This is, for example, particularly useful in the case of strongly varying tidal currents and water turbulences which can produce long rest periods and strongly oscillating load phases with small angles of attack and approach movements. In order to reduce bending forces that act on the hub a tapered roller bearing assembly can make possible a rigid design that reduces deformations and thus can reduce leakages of the seal system.

In some exemplary embodiments the outer seal system can include a corrosion-protection coating. The bearing module can further comprise a sacrificial anode for corrosion protection. A corrosion protection can increase a lifespan of the bearing module and make possible a greater sealing effect with prolonged use.

In some exemplary embodiments the outer seal system can comprise a seal carrier, and seal lips movable in a radial direction with respect to the rotor-blade shaft. The seal lips can be disposed at an angle to the radial direction with respect to the rotor-blade shaft. The seal lips can run on a bush in the radial direction. A pressure exerted by a liquid medium onto the seal lip can be transmittable to the seal carrier in the axial and radial direction with respect to the rotor-blade shaft. The outer seal system can thus, for example, reduce a pressing force of the seal lips on the bush and reduce wear.

In at least some exemplary embodiments the bearing module further comprises a state-monitoring system, which is configured to provide information about an ingress of water. The state monitoring system can thus, for example, provide information regarding a necessary maintenance due to water ingress, before the rotor-blade hub and the underwater power plant are damaged.

Exemplary embodiments further provide a manufacturing method for an underwater power plant including installing the bearing module as an installation unit. The installation unit can be installed and replaced with a reduced time expenditure, and a simplified repair can be effected in a repair center, and need not be carried out on site. Furthermore, the manufacturing of the installation unit can be effected in a (dust- and weather-) protected environment; the bearing need not be assembled on site.

Exemplary embodiments further provide an underwater power plant comprising the bearing module. The bearing module as an installation unit can be installed and replaced with a reduced time expenditure, and a simplified repair can be effected in a repair center, and need not be carried out on site.

The exemplary embodiments and their individual features disclosed in the above description, the following claims, and the accompanying Figures can be meaningful and implemented both individually and in any combination for the realization of an exemplary embodiment in its various designs. The Figures thus schematically show the following views.

DETAILED DESCRIPTION

In the following description of the accompanying depictions, identical reference numbers designate identical or comparable components. Furthermore, summarizing reference numbers are used for components and objects that appear multiple times in an exemplary embodiment or in an illustration, but that are described together in terms of one or more common features. Components or objects that are described with the same or summarizing reference numbers can be embodied identically, but also optionally differently, in terms of individual, multiple, or all features, their dimensions, for example, as long as the description does not explicitly or implicitly indicate otherwise.

Figure 1:
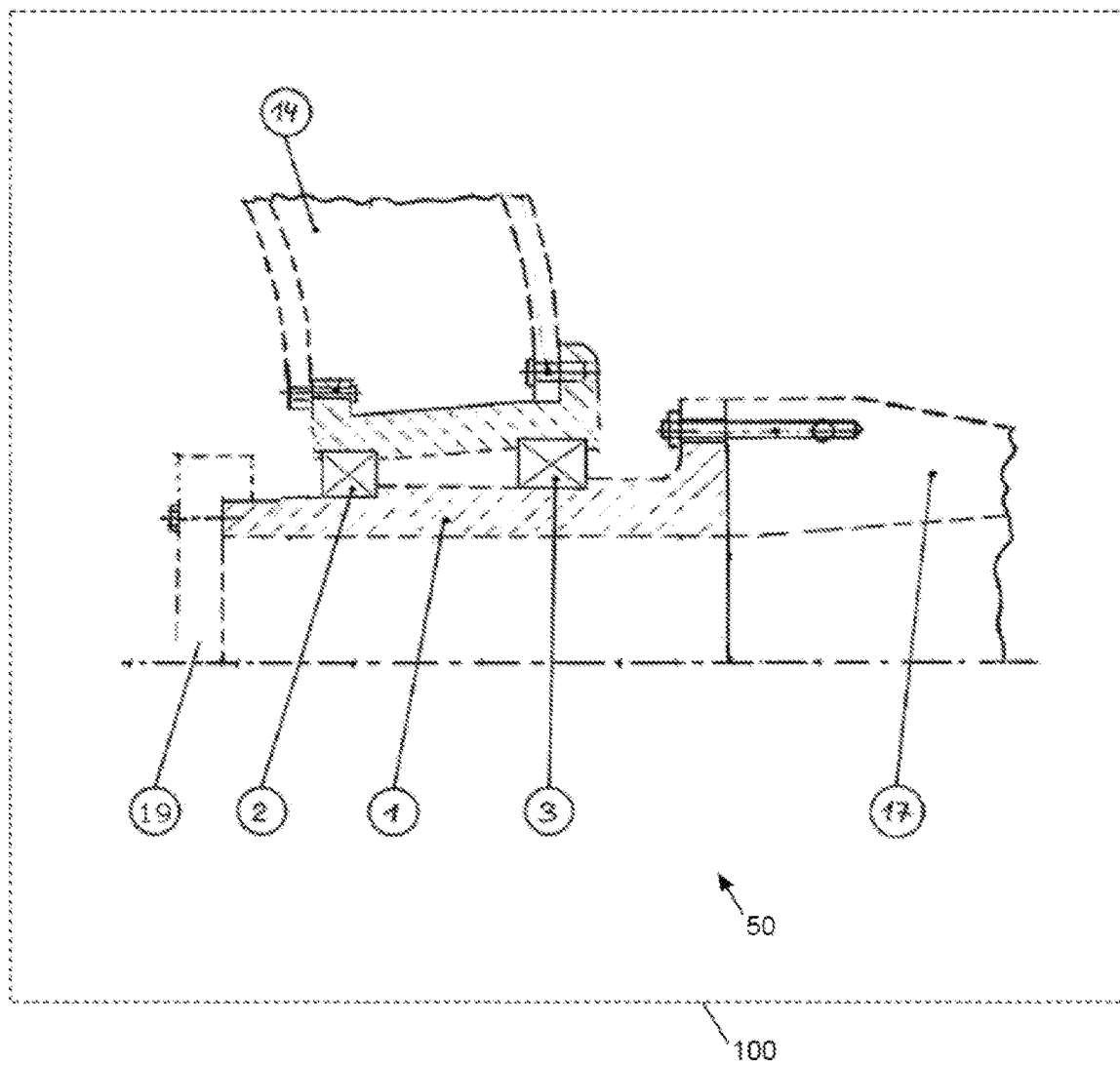
FIG. 1 is a schematic depiction of a bearing module for adjusting an angle of attack of a rotor blade in an underwater power plant according to an exemplary embodiment.

FIG. 1 shows a bearing module 50 for adjusting an attack angle of a rotor blade 17 in an underwater power plant 100. The bearing module comprises at least two bearings 2, 3 for supporting a rotor-blade shaft. The at least two bearings 2, 3 are axially spaced from each other on the rotor-blade shaft 1. The bearing module 50 comprises at least one first attachment means for producing a mechanical connection to a rotor-blade hub 14. The bearing module 50 further comprises at least one second attachment means for producing a mechanical connection to the rotor blade 17. The bearing module 50 further comprises a third attachment means for producing a mechanical connection to a blade adjustment mechanism 19. The water, the tides, or the current can act on the rotor blade 17 and generate a torque on the rotor-blade hub 14, which can be connected to a rotor shaft.

The bearing module 50 is combined into an installation unit. In FIG. 1 the first, second, and third attachment means are embodied as screw- or bolt-connections. Alternatively the mechanical connection can correspond to a adhesive-, weld-, screw-, rivet-, clamp-, clip-, latch-connection and/or the like. The first, second, and third attachment means can therefore also correspond to an adhesive, a weld seam, a screw, a bolt, a rivet, a clip, or complementary embodied interference-fit parts of the components.

Figure 2:
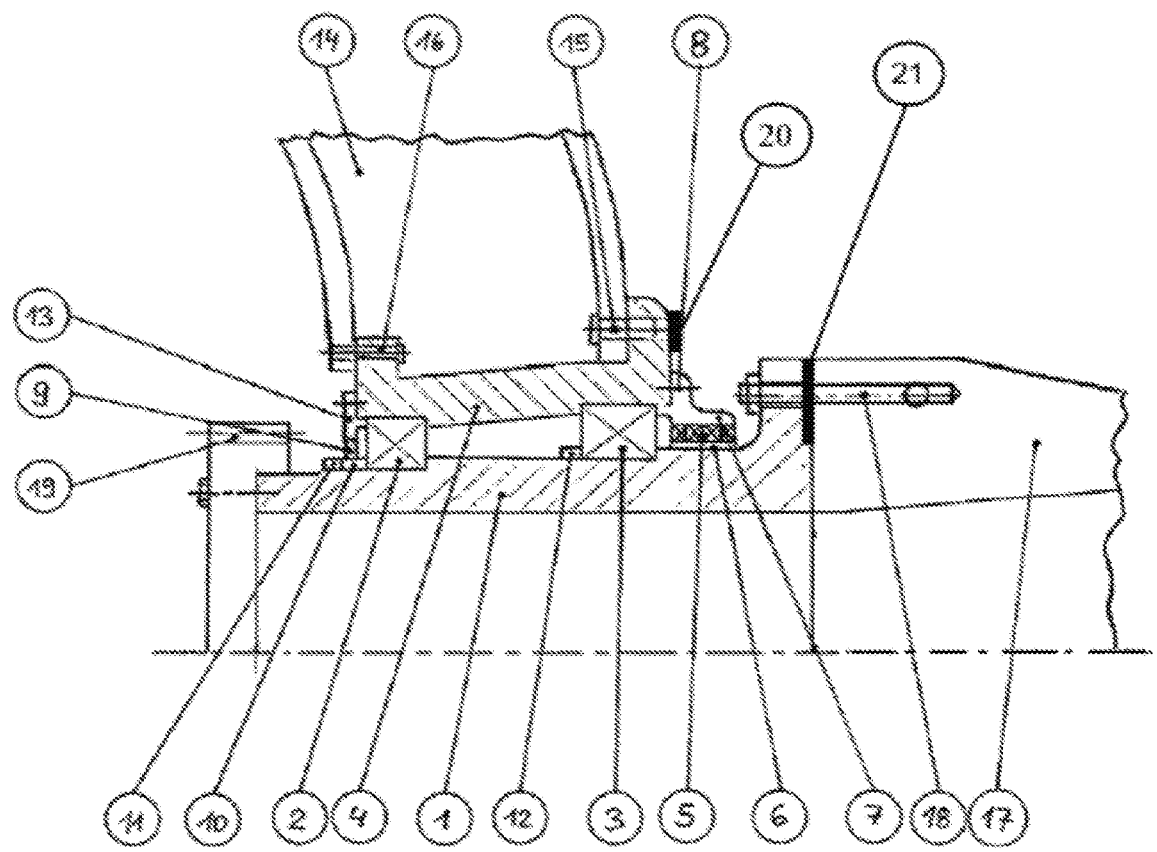
FIG. 2 is a schematic depiction of a bearing module for adjusting of an angle of attack of a rotor blade in an underwater power plant according to a further exemplary embodiment, further comprising an inner seal system and an outer seal system.
Figure 3:
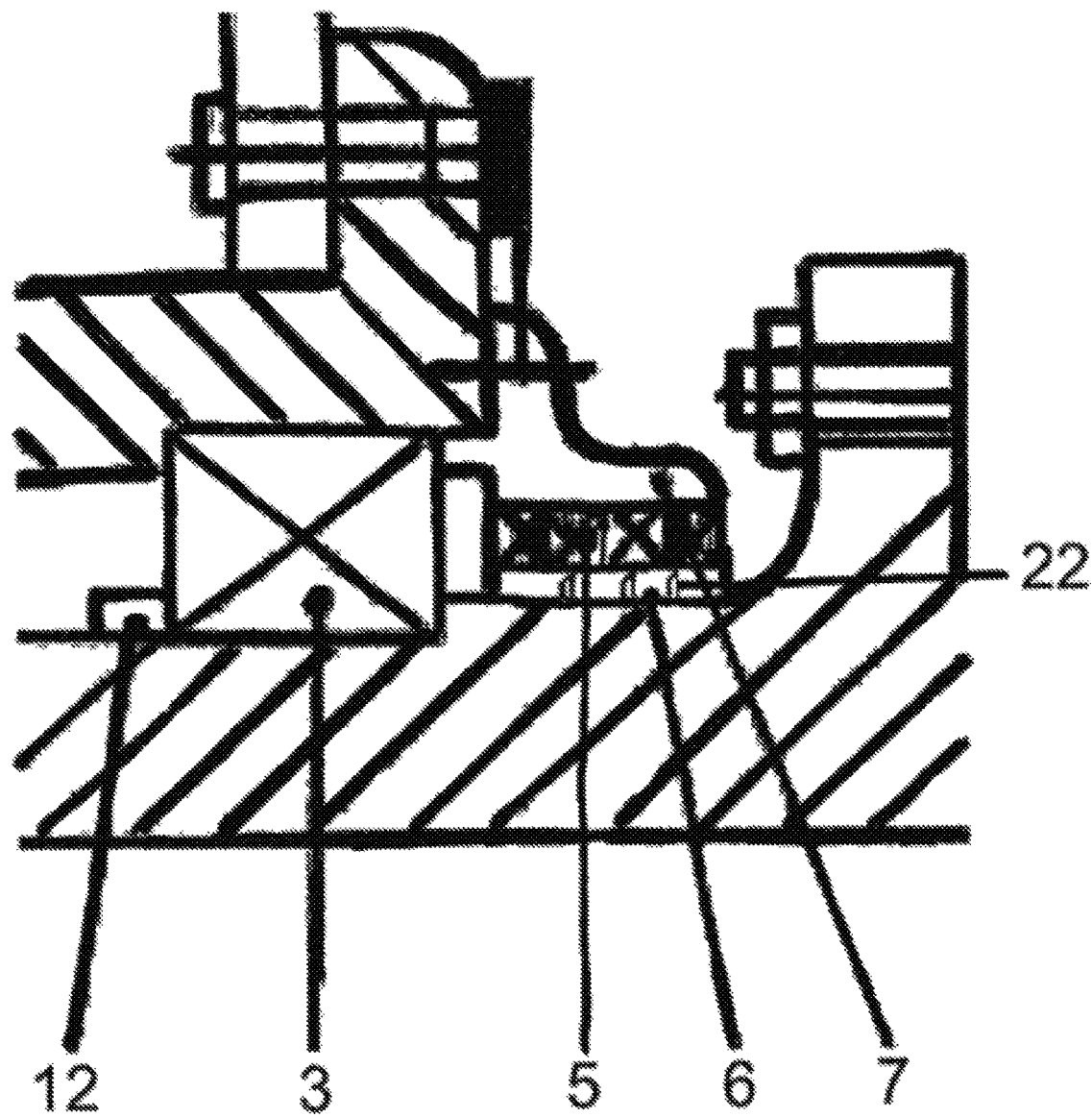
FIG. 3 is a schematic depiction of the outer seal system, further comprising seal lips.
Figure 4:
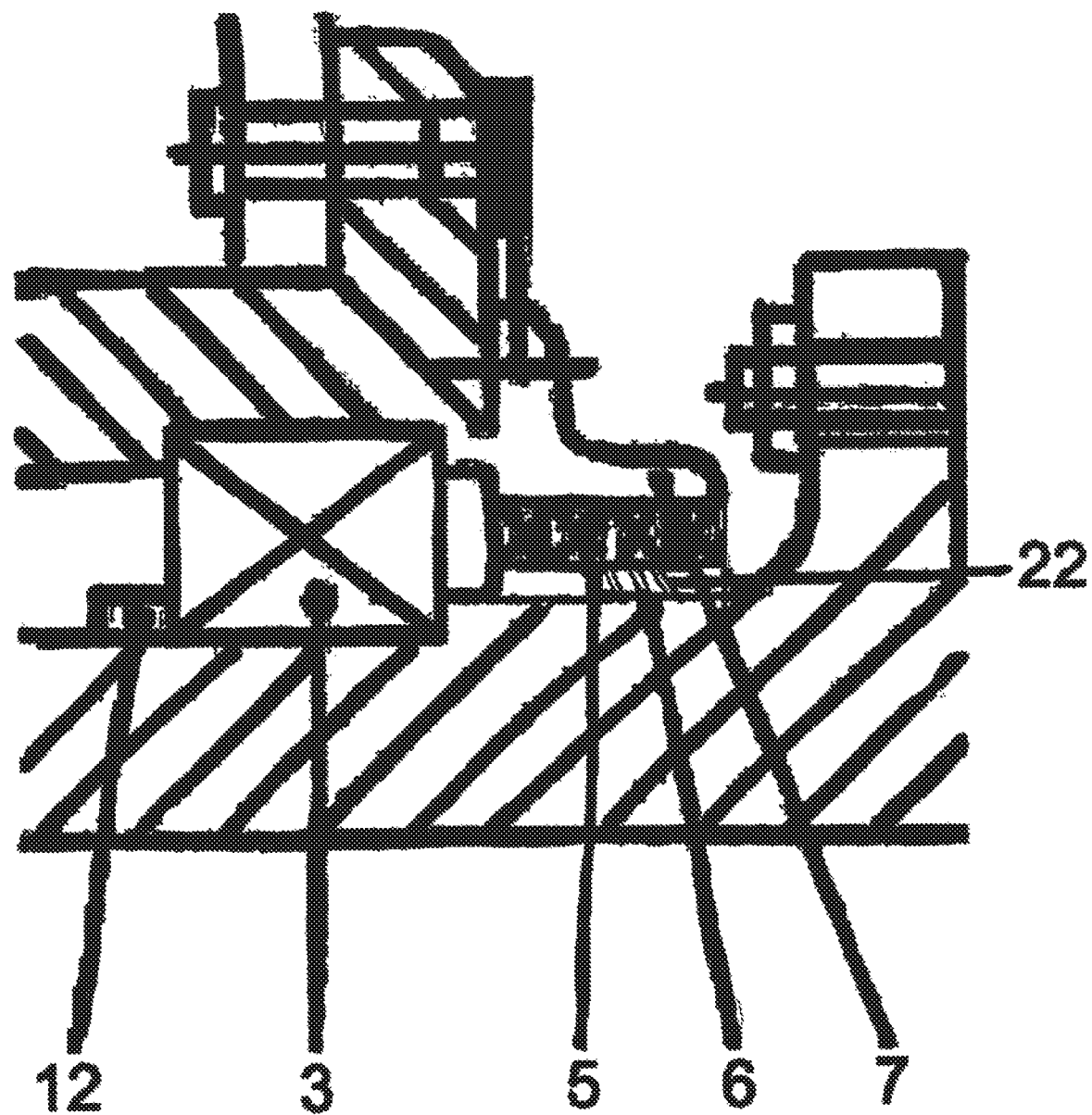
FIG. 4 is a schematic depiction of the outer seal system, further comprising seal lips disposed at an angle to the radial direction with respect to the rotor-blade shaft.

The mechanical connection by the first attachment means is, as also depicted in FIG. 2, embodied as outer and inner connection 15, 16 to the rotor-blade hub 14. The mechanical connection by the second attachment means is, as also depicted in FIG. 2, embodied as a screwed rotor-blade connection 18 between rotor-blade shaft 1 and rotor blade 17. For a higher robustness of the mechanical connection by the second attachment means, in some exemplary embodiments a flange coupling, for example, via a friction disc 21, can furthermore be used, which increases a friction inside the mechanical connection and can thus make possible a higher capacity for transfer of load and torque. Thus, for example, the connection can be relieved.

In some exemplary embodiments the at least two bearings 2, 3 can comprise at least one element of the group of sliding bearings and rolling-element bearings. The rolling-element bearing can be based on at least one element of the group of tapered rollers, barrel rollers, spherical bearing rollers, cylindrical rollers, needle rollers, and balls. The at least two bearings 2, 3 can, for example, comprise at least one locating bearing and at least one non-locating bearing. The at least two bearings 2, 3 can, for example, correspond to an adjusted bearing assembly using two tapered roller bearings.

Exemplary bearing-types and -assembles for the at least two bearings 2, 3 are, for example, two rigid tapered roller bearings in back-to-back arrangement, two rigid bearings including a locating bearing and a non-locating bearing (for example a cylindrical roller bearing and a paired tapered roller bearing), or two flexible bearings including a locating bearing and a non-locating bearing (for example, two spherical roller bearings or a spherical roller bearing in combination with a compact, self-aligning bearing).

A preloaded assembly of tapered roller bearings in back-to-back arrangement can, for example, be adapted with a predetermined (for example, precalculated) bearing spacing, in order to efficiently withstand high impact forces and bending moments that are transmitted from the rotor blade 17 via the rotor blade shaft 1 into the rotor-blade hub. Tapered roller bearings here are a preferred exemplary embodiment, for example, due to their ability to support radial and axial loads, their high compactness compared to conventional slewing bearings, and stiffness compared to pivot bearings, which are preferably used in blade bearings and azimuth bearings and can reduce axial deformation and tilting of bearings.

In some exemplary embodiments the arrangement of the at least two bearings may allow little clearance and thus provide a robust bearing system for tidal power plants. This is useful, for example, in the case of highly varying tidal currents and water turbulences which can produce long rest periods and strongly oscillating load phases with small angles of attack and approach movements. In order to reduce bending forces that act on the rotor-blade hub 14, a tapered-roller-bearing assembly can make possible a rigid design that reduces deformations and thus can reduce leakages of the seal system. A preloaded bearing assembly having a 360° load zone can help to prevent or to reduce a one-sided loading and undesired fluting. Further bearing assemblies such as toroidal roller bearings (also English CARB (Toroidal Roller Bearing)) and double row tapered roller bearings (also English DRTRB (Double Row Tapered Roller Bearing)) or cylindrical roller bearings (also English CRB, Cylinder Roller Bearing), and DRTRB are further possible exemplary embodiments.

The at least two bearings 2, 3 can be, for example, oil- or grease-lubricated; this can depend on individual requirements, designs, and experiences. Oil-lubricated bearings can, for example, require more complex seals. The bearing module 50 can be prelubricated prior to a first use. With longer operating times the bearing module 50 can further comprise a lubricating system. The bearing module 50 can, for example, be equipped with an automatic grease relubrication system.

In at least some exemplary embodiments an arrangement of the rotor blade 17 in the radial direction with respect to the axis of rotation of the rotor-blade hub 14 is outside the rotor-blade hub 14. An arrangement of the blade adjustment mechanism 19 can be provided in the radial direction with respect to the axis of rotation of the rotor-blade hub 14 inside the rotor-blade hub 14. The axis of rotation of the rotor-blade hub 14 and the axis of rotation of the rotor-blade shaft 1 for the adjusting of the rotor blade 17 can differ in their directions here. For example, the axes of rotation of the rotor-blade hub 14 and the axis of rotation of the rotor-blade shaft 1 can be essentially orthogonal to one another. The axes of rotation can, for example, deviate between 0 and 25° from orthogonality. The mechanical connection of the bearing module 50 to the rotor blade 17 by the second attachment means can be provided, for example, via the rotor-blade shaft 1. The mechanical connection of the bearing module 50 to the blade adjustment mechanism 19 can be provided by the third attachment means via the rotor-blade shaft 1. The blade adjustment mechanism 19 can, for example be mechanically connected to the rotor blade shaft 1, for example, via an adjustment gearbox (pitch drive), a tappet, an electrical or hydraulic hub cylinder, by the third attachment means. The blade adjustment mechanism 19 can, for example, be embodied by a suitable mechanism in the range between 0° and 90°. A gear including bull gear and driving pinion shaft, eccentric cams, and adjusting cylinder (hydraulic, electric), or a lever joint is suitable for this purpose, for example.

FIG. 2 shows a further exemplary embodiment. In this exemplary embodiment the exemplary bearing module 50 comprises an inner bearing 2 and an outer bearing 3, which correspond to the at least two bearings 2, 3, a bearing housing 4, an outer seal system 5 for sealing against seawater, a bush 6, a seal carrier 7, a connection 8 to the bearing housing 4, an inner seal system 9, a further bush 10 for the inner seal system 9, a shaft nut or clamp ring 11, an outer shaft nut or clamp ring 12, and a housing cover 13.

In one preferred exemplary embodiment the bearing module 50 further comprises the bearing housing 4 and the rotor blade shaft 1. The mechanical connection of the bearing module 50 to the rotor-blade hub by the first attachment means can be provided via the bearing housing 4. The bearing housing 4 here can form a bearing intermediate space with the rotor-blade shaft 1. The at least two bearings 2, 3 can be disposed between the rotor blade shaft 1 and the bearing housing 4. The bearing housing 4 can, for example, at least partially radially comprise and/or encase the rotor-blade shaft 1 with regard to an axis of rotation of the rotor-blade shaft. The bearing housing can, for example, include a corrosion-reducing or corrosion-inhibiting protective layer. In at least some exemplary embodiments the bearing module 50 can further comprise a sacrificial anode 20, for example, in order to reduce or inhibit a corrosion of the bearing housing or of a seal system.

The bearing housing 4 from FIG. 1 holds both bearings that are attached to the rotor-blade shaft 1 and the inner 9 and outer 5 seal system, which can be flanged onto the outer bearing 3. The bearing assembly can make it possible that the bearing module 50 can be simply and quickly installed and removed onto/from the hub 14 and facilitate a repair. This can be achieved, for example, by a flange screw connection as connection 15, 16 as first attachment means in combination with contacting centering surfaces. Furthermore the bearing housing 4 can include lifting devices or lifting threads for a simplified crane assembly in order to facilitate installation and removal. In addition, the bearing housing 4 or the bearing module 50 can be equipped with sensors for state measuring, for example, vibration sensors, for example, temperature sensors, for example, strain gauges for bearing monitoring. Furthermore sensors (moisture sensors or fill-level sensors) can make possible a measuring of penetrating liquids.

In at least some exemplary embodiments the bearing module 50 can further comprise an inner seal system 9 and an outer seal system 5. The inner seal system can, for example, be disposed radially farther inward with respect to the axis of rotation of the rotor-blade hub 14 than the at least two bearings 2, 3. The outer seal system 10 can be disposed radially farther outward with respect to the axis of rotation of the rotor-blade hub 14 than the at least two bearings 2, 3.

In at least some exemplary embodiments the outer seal system 5 can include a corrosion-protection coating. The outer seal system 5 can, for example, be configured to reduce or to inhibit the penetration of seawater into the bearing module. The outer seal system can, for example, include one or more seal lips 22 that extend on a bush 6 in the radial direction and seal it. The bush 6 can, for example, be used as a hardened counter-running surface for the one or more seal lips 22, and in some exemplary embodiments have a corrosion protection. In some exemplary embodiments the outer seal system 5 can, for example, comprise a seal carrier 7 and seal lips 22 movable in a radial direction with respect to the rotor blade shaft 1.

The seal lips 22 can be disposed at an angle to the radial direction with respect to the rotor-blade shaft 1. The seal lips 22 can extend in the radial direction on a bush 6. A pressure exerted by a liquid medium onto the seal lips 22 can be transmittable to the seal carrier 7 in the axial and radial direction with respect to the rotor-blade shaft 1. The seal carrier 7 can, for example, have a mechanical connection to the bearing housing 4 via a fourth attachment means 8. The fourth attachment means can be, for example, a screw- or bolt-connection.

At the position of the inner bearing 2 in the rotor-blade hub the inner seal system 9, which runs against an inner bush 10, can be installed, for example, in order to hold the lubricant inside the bearing system. The inner seal system 9 can be, for example, a simpler lip seal, which is held by a seal carrier. A hardened inner layer including a corrosion-protection layer can be provided, for example, as counter-surface for the seal lip. The bearing housing 4 and the seal carrier 7, which can also be connected to the rotor-blade hub 14, can secure the outer ring in the axial direction and, for example, furthermore hold the inner seal. The axial securing of the inner ring of both bearings can be provided, for example, by an inner shaft nut or clamp ring 11 and/or an outer shaft nut or clamp ring 12 and the outer seal system 5.

The bearing module can, for example, be installed in the rotor hub as a preassembled bearing cartridge via a screw connection. The outer parts, such as, for example, the flange connection to the rotor blade, the outer seal system 5 (the main water seal) and the bearing housing can, for example, be protected against corrosion, for example, by a corrosion-protection coating, a sacrificial anode, or both.

In some exemplary embodiments the bearing module 50 can further include a state-monitoring system, which is configured to provide information about a water ingress. This can be achieved, for example, by drainage bores in the construction in connection with corresponding pressure- or fill-level-sensors.

The bearing module 50 can further comprise a further state-monitoring system, which can measure, for example, vibration, noise, and the temperature at both bearing positions.

Corresponding sensors can be, for example, moisture sensors, water-ingress sensors, vibration sensors, seismographs, temperature sensors, or noise sensors. A sensor for water ingress or a moisture sensor can, for example, also be comprised in bearing module 50 in order to recognize water penetrating from outside which can penetrate into the bearing and the bearing housing. The bearing module 50 can further comprise a drainage tank in order to collect the penetrated water. Furthermore the bearing module 50 can comprise a pump that removes the penetrated water, for example, from the drainage tank.

In some exemplary embodiments the bearing module 50 can further comprise a transmitting module that can provide measured data of the state-monitored system and/or of the further state-monitored system of a monitoring unit of the underwater power plant 100, for example via a wireless or wired connection. Based on the data about the vibration, the noise measurement, or the water ingress, the monitoring unit can then analyze whether a maintenance or a replacement is advisable.

The bearing module 50 can, for example, be used as a compact blade bearing unit for tidal power plants. In at least some exemplary embodiments the bearing module 50 can include the following features:

- The bearing module 50 can, for example, be provided in various sizes and configurations in order to be used with various turbine performance classes.
- Compared to conventional, for example, multi-part, solutions, in some exemplary embodiments the bearing module design is improved with regard to compactness, stiffness, and weight.
- In some exemplary embodiments the bearing module 50 is configured to handle long rest periods and strongly oscillating load phases with small angles of attack and vibration movements. For example, the bearing module 50 can be configured to make possible an adjusting of the angle of attack in fractions of a second.
- In some exemplary embodiments the bearing module 50 can have a cost- and size-advantage compared to conventional large rolling-element bearings having large diameter.
- The bearing module 50 can, for example, correspond to a preassembled unit for simple and rapid turbine installations, repairs, and replacement. The assembly of the bearing module 50 can, for example, be undertaken by experts in highly clean work areas.
- In some exemplary embodiments the corrosion protection can make possible a use of the bearing module 50 in seawater.
- In some exemplary embodiments the use of special pressure-resistant seal systems can make possible a use of the bearing module 50 at depths of up to 80 m.
- In at least some exemplary embodiments the bearing module 50 has a high capacity for axial and radial loads.
- The bearing module 50 can be axially and radially preloaded without clearance in order to support vibrational and sudden loads.

In some exemplary embodiments the at least two bearings 2, 3 and the seal systems 5, 9 can be adjusted as exactly as possible in order to prevent or to reduce an eccentric load on seals.

A further exemplary embodiment is a turbine for an underwater power plant 100 comprising the bearing module 50. The turbine can comprise, for example, at least two rotor blades, wherein the at least two rotor blades are supported via at least two bearing modules 50.

FIG. 1 further illustrates a block diagram of an exemplary embodiment of an underwater power plant 100 comprising the bearing module 50. The underwater power plant can comprise, for example, one or more turbines wherein the turbines can comprise at least two rotor blades including at least two bearing modules 50.

Exemplary embodiments further provide a manufacturing method for an underwater power plant 100 including installing of the bearing module 50 as an installation unit. The installation into the rotor-blade hub 14 of a turbine of the underwater power plant can, for example be effected via an interference fit or friction fit, for example, using the screw connection 15, 16.

The design and the controlled manufacturing, assembly, and testing of all components can make possible that the bearing module 50 is more robust at its site of operation than conventional solutions, which can make possible a more reliable operation.

At least some exemplary embodiments can be more economical to manufacture since there can be greater similarities of components of different units, which can make possible scale effects even with individually adapted units.

In exemplary embodiments the bearing module 50 can be easily accessible and removable, which can make possible a simpler and cost-reducing maintenance and repair. A holistic approach can make possible a repair in service centers, which can make possible a central storing of replacement-units and -parts.

Exemplary embodiments can, for example, be based on a holistic design- and manufacturing-approach. They can make possible a compactness by intelligent integration of components. The bearing module 50 can be provided, for example, as a turnkey system from a single manufacturer. The bearing module 50 can make possible a simple replacing of worn or damaged parts and represent a more cost-effective solution than conventional systems.

The features disclosed in the foregoing description, the following claims, and the accompanying Figures can be meaningful and can be implemented both individually as well as in any combination for the realization of an exemplary embodiment in its various designs.

Although some aspects of the present invention have been described in the context of a device, it is to be understood that these aspects also represent a description of a corresponding method, so that a block or a component of a device is also understood as a corresponding method step or as a feature of a method step. In an analogous manner, aspects which have been described in the context of or as a method step also represent a description of a corresponding block or detail or feature of a corresponding device.

The above-described exemplary embodiments represent only an illustration of the principles of the present invention. It is understood that modifications and variations of the arrangements and details described herein will be derived by other persons of skill in the art. It is therefore intended that the invention be limited only by the scope of the following patent claims, and not by the specific details which have been presented herein with reference to the description and the explanation of the exemplary embodiments.

REFERENCE NUMBER LIST

1 Rotor blade shaft
2 Inner bearing
3 Outer bearing
4 Bearing housing
5 Outer seal system
6 Bush
7 Seal carrier
8 Connection to the bearing housing
9 Inner seal system
10 Bush inner seal system
11 Inner shaft nut/clamp ring
12 Outer shaft nut/clamp ring
13 Inner housing cover
14 Rotor-blade hub
15 Outer connection to the rotor-blade hub
16 Inner connection to the rotor-blade hub
17 Rotor blade
18 Rotor-blade connection between rotor-blade shaft and rotor blade
19 Blade adjustment mechanism
20 Sacrificial anode
21 Friction disc
22 Seal lips
50 Bearing module
100 Underwater power plant

The invention claimed is:

1. A bearing module for adjusting an angle of attack of a rotor blade in an underwater power plant, comprising:
   a rotor blade shaft;
   at least two bearings for supporting the rotor-blade shaft, the at least two bearings being axially spaced from each other on the rotor-blade shaft;
   first attachment means for producing a mechanical connection to a rotor-blade hub;
   second attachment means for producing a mechanical connection to the rotor blade;
   third attachment means for producing a mechanical connection to a blade adjustment mechanism,
   wherein the bearing module is an installation unit,
   wherein the rotor blade extends radially outside the rotor-blade hub and the blade adjustment mechanism extends radially inside the rotor-blade hub, an axis of rotation of the rotor-blade hub differs from an axis of rotation of the rotor blade shaft,
   wherein the second attachment means includes a first portion of the rotor-blade shaft and the third attachment means includes a second portion of the rotor-blade shaft;
   wherein the first attachment means includes a bearing housing which forms a bearing intermediate space with the rotor-blade shaft, and the at least two bearings are disposed between the rotor-blade shaft and the bearing housing;
   an inner seal system and an outer seal system, the inner seal is disposed a first radial distance from the axis of rotation of the rotor-blade hub and the outer seal system is disposed at a second radial distance from the axis of rotation of the rotor-blade hub, the outer seal system comprises a seal carrier and seal lips movable in a radial direction with respect to the rotor-blade shaft,
   wherein the seal lips are disposed at an angle to the radial direction with respect to the rotor-blade shaft, the seal lips extend in the radial direction on a bush, and
   wherein a pressure exerted by a liquid medium on the seal lips is transmissible to the seal carrier in the axial and radial direction with respect to the rotor-blade shaft.

2. The bearing module according to one claim 1, wherein the at least two bearings comprise at least one element selected from the group consisting of: sliding bearings and rolling-element bearings.

3. The bearing module according to claim 1, wherein at least one of the at least two bearings is selected from the group consisting of: tapered rollers, barrel rollers, rollers for spherical bearings, cylindrical rollers, needle rollers, and balls.

4. The bearing module according to claim 1, wherein the at least two bearings comprise at least one locating bearing and at least one non-locating bearing.

5. The bearing module according to claim 1, wherein the at least two bearings correspond to an adjusted bearing assembly using two tapered roller bearings.

6. The bearing module according to claim 1, wherein the outer seal system includes a corrosion-protection coating, or wherein the bearing module further comprises a sacrificial anode for corrosion protection.

7. The bearing module according to claim 1, further comprising a state-monitored system configured to provide information about a water ingress.

8. An underwater power plant comprising the bearing module according to claim 1.

9. A method of manufacturing an underwater power plant comprising:
- providing a bearing module according to claim 1 as an installation unit;
- attaching at least one rotor blade to the bearing module; and
- attaching a blade adjustment mechanism to the bearing module.

10. A method of manufacturing an underwater power plant comprising:
- providing a bearing module according to claim 1 as an installation unit;
- attaching at least one rotor blade to the bearing module; and
- attaching a blade adjustment mechanism to the bearing module.

11. A method of manufacturing an underwater power plant comprising:
- assembling a bearing module according to claim 1 in a weather-protected environment at a first location;
- transporting the assembled bearing module to a power plant installation site at a second location; and
- attaching at least one rotor blade and a blade adjustment mechanism to the bearing module at the second location.

12. A method of manufacturing an underwater power plant comprising:
- providing a bearing module according to claim 1 as an installation unit;
- attaching at least one rotor blade to the bearing module;
- attaching a blade adjustment mechanism to the bearing module.

* * * * *